June 9, 1936. E. J. FEILER 2,043,407
GREASE GUN ATTACHMENT
Filed Dec. 12, 1934
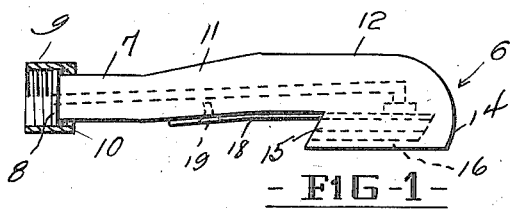
- FIG -1-
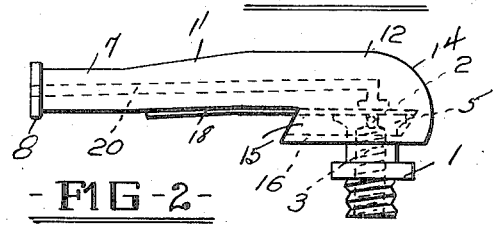
- FIG -2-
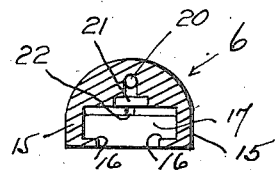
- FIG -6-
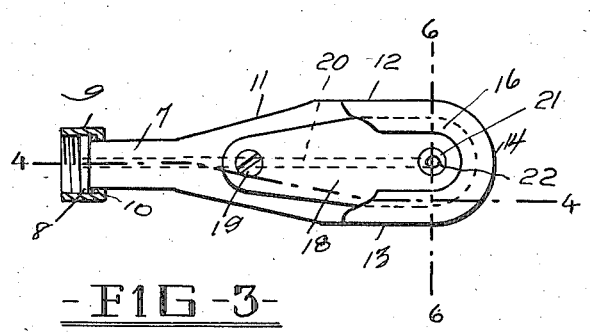
- FIG -3-
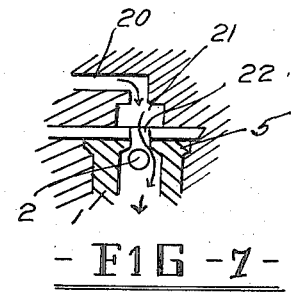
- FIG -7-
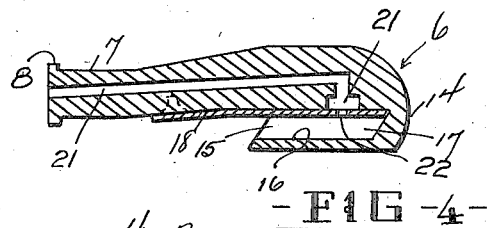
- FIG -4-
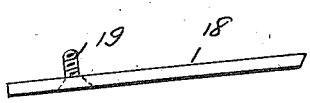
- FIG -8-
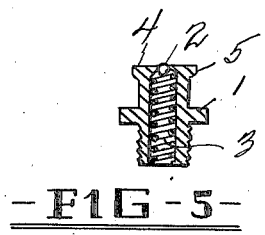
- FIG -5-
INVENTOR
E. J. FEILER,
BY
ATTORNEY Patented June 9, 1936

2,043,407

UNITED STATES PATENT OFFICE 2,043,407

GREASE GUN ATTACHMENT

Edmond J. Feiler, Madison, Wis.

Application December 12, 1934, Serial No. 757,209

2 Claims. (Cl. 285—143)

My present invention in its broad aspect, has to do with improvements in attachments for coupling a high-pressure lubrication line, commonly called a grease gun, to a fitting leading to the part to be greased. In present practice, especially in the greasing of automobiles and the like, it is customary to force a heavy, thick grease into the parts under very high pressure; the parts are provided for this purpose with special fittings or nipples, to which the head of the grease gun is applied and the grease released. These fittings are of several types, and a common type is a ball-valve fitting which is opened by pressure of grease and closed by either a spring or back pressure. Ordinarily the workman is required to exert considerable pressure on the head of the grease gun to prevent the gun from being forced off the nipple due to pressure of grease; some nipples and heads are provided with pin and bayonet slot attachments for retaining the head on the nipple under pressure; but the principal disadvantage of these is that an accumulation of dirt and grease will render the fitting inoperative or unhandy or not tight, and it is necessary for the workman to wipe off the nipples before starting the greasing operation. Others require the application of considerable pressure by a workman; still others are not quickly attached and detached so that the operation of greasing is prolonged.

My present invention, as distinguished from the above and other types of attachments now in common use, is not rendered inoperative or unhandy by accumulation of dirt or grease; is self-cleansing, and is also adapted to simultaneously remove grease and dirt from a fitting or nipple when applied thereto; will not leak or become loose; requires no muscular effort by the workman; and is quickly attachable and detachable, thereby effecting a saving of time and effort. Furthermore, my attachment is simple, not fragile, has no parts which are easily broken or deranged; may be readily cleaned; will not clog, and is both positive and self-centering and self-cleansing. It is readily manufactured and may be sold at small cost. Other and equally important advantages and objects will be apparent as the description proceeds in conjunction with the drawing forming a part of this application, and in which;—

Figure 1 is a side elevation;

Figure 2 is a side elevation of the fitting applied to a nipple;

Figure 3 is a plan view;

Figure 4 is a section taken on the line 4—4 of Figure 3;

Figure 5 is a section through the nipple;

Figure 6 is a section taken on the line 6—6 of Figure 3;

Figure 7 is a diagrammatic view showing the path of grease from the head or attachment through the nipple;

Figure 8 is a detail of the spring plate used with my attachment.

In the drawing wherein like characters of reference are used to designate like or similar parts throughout the several views;—

The numeral (1) designates a nipple or fitting usually permanently carried as a part of the fixed automotive equipment and which leads to the part to be lubricated—not shown. The nipple (1) is of the ball-valve type, the ball being shown at (2) and normally held closed by a spring (3); although in some types the spring is eliminated and back pressure used to seat the ball. The present nipple is formed in accordance with my invention with a flat head (4) which is annularly flanged at (5) for the purpose which will hereinafter appear.

My attachment which is shown generally at (6) has a shank (7) formed with an annularly flanged end (8) receivable in the internally threaded coupling nut (9); there being packing (10) between the flange of the shank and the end of the nut to form a tight joint. The nut couples the attachment to a high pressure grease line or grease gun—not shown.

The shank is gradually increased in both width and thickness as at (11) toward an enlarged head (12); the head is also slightly above the center axial line of the shank as shown in Figures 1—2—3. The head has relatively parallel sides (13) and a semi-circular end (14) and has a downwardly extending flange (15) which is turned inwardly along the sides and ends as at (16) to form a pocket (17) into which the flanged head (4) of the nipple (1) is adapted to be quickly seated by hooking the attachment over the nipple and drawing backward upon it, in which case the flange (5) of the head rides on the inturned edges (16) in the nature of a track. There may be very slight increase in width of the inturned edges (16) toward the end of the attachment to tightly place the flat head against the internal face of the pocket if desired. My attachment is also provided with a plate (18) which may have a certain amount of resiliency, which is attached by a screw or the like (19) adjacent the shank and extends forwardly to completely cover the internal face of the pocket as shown in Figures 3 and 4, and in detail in Figure 8. This facilitates easy attachment and removal of the attachment since the plate is of hard polished steel, and also tends to insure tight fitting of the flat head (4) of the nipple in the attachment. Grease under high pressure is forced through the channel (20) in the attachment through the enlarged mouth (21) thereof through the smaller opening (22) in the plate (18) and into the fitting (1); the ball-valve being opened by pressure of grease thereagainst as illustrated diagrammatically in Figure 7.

In operation, it is merely necessary for a workman to hook the head of the attachment over the fitting, in which case the backward motion to seat the fitting in the pocket tends to cleanse the fitting of dirt and grease; and the flanges hold the fitting in place so that no muscular effort is required of the workman; neither can grease escape during the greasing operation, and there are no parts which are likely to become deranged or broken. Since minor changes may be made in structure, form, shape and size as variations in practice occur without departing from my inventive concept, such changes are permissible provided that they fall within the scope of what is claimed.

I claim:—

1. A discharge nozzle for a grease gun, comprising a body part formed with a shank and a head fashioned to provide a quick detachable connection with a lubricant receiving nipple and having a grease channel therein leading to an enlarged mouth in the head at the discharge end of the nozzle, and an elongated metal plate attached at one of its ends to the shank and extending forwardly past the mouth in the head and disposed to overlie the mouth and provided with an opening therein registering with the mouth but smaller than the mouth, said elongated metal plate designed to seal the connection between the nozzle and a nipple against escape of grease under pressure and to form a smooth riding surface for quick attachment of the nozzle with the nipple.

2. A discharge nozzle for a grease gun, comprising a body part formed with a relatively long shank and a head of broader dimensions than the shank and rounded off at the end, the head part provided with flanges to provide a quick detachable connection with a lubricant receiving nipple and having a grease channel therein leading to an enlarged mouth, an elongated spring metal plate attached at one of its ends to the under side of the shank and extending forward between the flanges of the head to overlie the mouth therein and having an opening registering with the mouth but of smaller size than the mouth to permit passage of grease from the mouth to a nozzle, said elongated spring metal member designed to seal the connection between the nozzle and the nipple against escape of grease under pressure, and to form a smooth riding surface for quick attachment of the nozzle with the nipple.

EDMOND J. FEILER.